(12) United States Patent
Breton (10) Patent No.: US 6,868,378 B1
(45) Date of Patent: Mar. 15, 2005

(54) PROCESS FOR VOICE RECOGNITION IN A NOISY ACOUSTIC SIGNAL AND SYSTEM IMPLEMENTING THIS PROCESS

(75) Inventor: Pierre-Albert Breton, Pessac (FR)

(73) Assignee: Thomson-CSF Sextant, Velizy Villacoublay (FR)

(*) Notice: Subject to any disclaimer, the term of this patent is extended or adjusted under 35 U.S.C. 154(b) by 0 days.

(21) Appl. No.: 09/831,344

(22) PCT Filed: Nov. 19, 1999

(86) PCT No.: PCT/FR99/02852

§ 371 (c)(1),
(2), (4) Date: May 10, 2001

(87) PCT Pub. No.: WO00/31728

PCT Pub. Date: Jun. 2, 2000

(30) Foreign Application Priority Data

Nov. 20, 1998 (FR) ............................................ 98 14641

(51) Int. Cl.[7] .............................................. G10L 15/20
(52) U.S. Cl. ....................... 704/233; 704/233; 704/238; 704/241; 381/94.1; 381/94.2; 381/94.3; 381/71.1
(58) Field of Search ..................... 704/200.1, 203–205, 704/226–228, 230, 231, 233, 236–241, 246, 250, 238; 381/94.1–94.3, 94.7, 71.1, 71.11, 71.12, 73.1; 708/300, 310, 314, 322, 400, 402–404

(56) References Cited

U.S. PATENT DOCUMENTS 5,583,961 A * 12/1996 Pawlewski et al. ......... 704/241
5,696,878 A * 12/1997 Ono et al. ................... 704/250
6,445,801 B1 * 9/2002 Pastor et al. ............... 381/94.2

6,570,991 B1 * 5/2003 Scheirer et al. ............. 381/110

FOREIGN PATENT DOCUMENTS

FR    PCT/FR99 02852    * 11/1999    ........... G10L/15/20

OTHER PUBLICATIONS

Rabiner, L. R. & Juang, B. H., "Fundamentals of speech recognition," Prentice–Hall 1993.*
Peters, M., "Binaural Bark subband preproceesing of non-stationary signals for noise robust speech feature extraction," Proc. IEEE International Symposium on Time–Frequency and Time–Scale Analysis, pp. 609–612, Oct. 1998.*
Vergin, R. et al., "Compensated mel frequency cepstrum coefficients," Proc. IEEE ICASSP '96, vol. 1, pp. 323–326, May 1996.*

(List continued on next page.)

*Primary Examiner*—Susan McFadden
*Assistant Examiner*—Tim Lao
(74) *Attorney, Agent, or Firm*—Oblon, Spivak, McClelland, Maier & Neustadt, P.C.

(57) ABSTRACT

The invention relates to a process and a system for voice recognition in a noisy signal. In a preferred embodiment, the system (2) comprises modules for detecting speech (30) and for formulating a noise model (31), a module (40) for quantifying the energy level of the noise and for comparing with preestablished energy spans, a parameterization pathway (5) comprising an optional denoising module (51), with Wiener filter, a module (52) for calculating the spectral energy in Bark windows, a module (50, 530) for applying a configuration of shift values (531), by adding these values to the Bark coefficients, as a function of the quantification (40), so as to modify the parameterization, a module (54) for calculating vectors of parameters, and a block (6) for recognizing shapes, performing the voice recognition by comparison with vectors of parameters prerecorded during a learning phase.

14 Claims, 5 Drawing Sheets

OTHER PUBLICATIONS

Vergin, R., "An algorithm for robust signal modeling in speech recognition," Proc. IEEE ICASSP '98, vol. 2, pp. 969–972, May, 1998.*

U.S. patent application Ser. No. 09/851,133, Breton, filed May 2001.*

Tseng, B. D. et al., "Analysis and generation of voice template based on shift invariance of Bark spectral envelope," Proc. Midwest Symposium on Circuits and Systems, vol. 2, pp. 729–734, Aug. 1990.*

Davis, S. et al., "Comparison of parametric representations for monosyllabic word recognition in continuously spoken sentences," IEEE Trans. on Acoustics, Speech, and Signal Processing, vol. 28, No. 4, pp. 357–366, Aug. 1980.*

Rabiner, L.R. & Juang, B.H., "Fundamentals of speech recognition," pp. 171–183, Prentice–Hall 1993.*

* cited by examiner

FIG_7

FIG_8

PROCESS FOR VOICE RECOGNITION IN A NOISY ACOUSTIC SIGNAL AND SYSTEM IMPLEMENTING THIS PROCESS

The present invention relates to a process for voice recognition in a noisy acoustic signal.

The invention also relates to a system for voice recognition implementing this process.

The invention therefore relates to the processing of acoustic signals containing speech picked up in noisy environments. Therefore, it finds a main, although non-exclusive application in the context of telephone or radiotelephone communications, voice recognition, sound capture on board civil or military aircraft, and more generally in all noisy vehicles, on-board intercommunications, etc.

By way of nonlimiting example, in the case of an aircraft, such noise results from the engines, from the air conditioning, from the ventilation for the on- board equipment or aerodynamic noise. All of this noise is picked up, at least partially, by the microphone into which the pilot or some other member of the crew is speaking. Moreover, for this type of application in particular, one of the characteristics of the noise is that it is highly variable over time. Specifically, such noise is highly dependent on the operating regime of the engines (take-off phase, steady regime, etc.). The useful signals, that is to say the signals representing conversations, also exhibit particular features: they are usually of short duration.

In speech processing, the steady state regimes are customarily regarded as stabilizing over durations of between 10 and 20 ms. This time interval is characteristic of the elementary phenomena of speech production and will be referred to as a frame hereinbelow.

In what follows, to fix matters and without thereby limiting in any respect the scope thereof, we shall consider the invention in the context of the preferred application of the invention, namely voice recognition in the cabin of an aircraft, unless otherwise stated.

In the known art, the majority of voice recognition systems available on the market are based on a so-called "global" process. As illustrated schematically by the block diagram of FIG. 1, located at-the end of the present description, such a system 1 comprises two main functional blocks: a block 11 for parameterizing a temporal signal received from an electroacoustic transducer, for example a microphone Mic, via analog/digital conversion circuits 10, and a block for classifying shapes 12.

Figure 1:
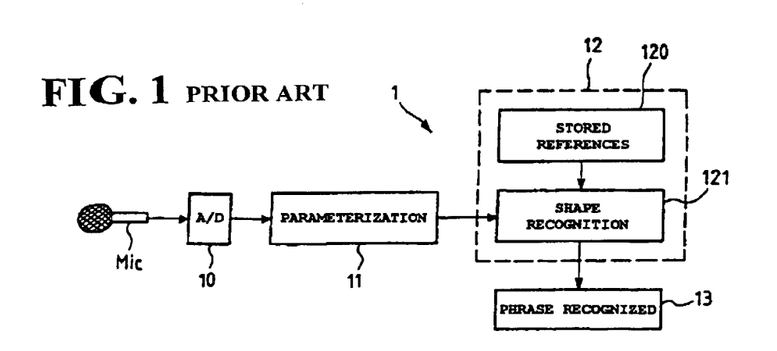
FIG. 1 schematically illustrates, in block diagram form, a voice recognition system of the known art, operating according to a so-called global process.

The parameterization transforms the temporal signal received from the analog/digital conversion circuits 10, namely a string of digital samples into a string of vectors of parameters, each vector being representative of a temporal segment which is referred to as a frame, as recalled earlier. The benefit of parameterization is that of expressing the acoustic content of the signal as a restricted number of values. In the application considered, a frame of 256 samples is typically represented by a vector of eight parameters.

The shape recognition block itself comprises two modules: a shape recognition module proper 121 and a module for storing acoustic references 120. The module 121 compares the series of vectors which emanates from the parameterization with a series of vectors which are obtained during a learning phase, during which phase acoustic impressions of each word or phoneme are determined. Comparison makes it possible to establish a "distance" between the phrase uttered and the syntax phrases. The syntax phrase exhibiting the smallest distance represents a priori the phrase to be recognized.

The digital signals representing the phrase recognized are transmitted to a usage block 13.

In the majority of applications targeted by the invention and in particular the preferred application, the useful signals, that is to say the voice signals, are marred by noise to a greater or lesser extent, since the microphone mic picks up sounds which are foreign to speech, as has been indicated. This noise constitutes the main source of errors in the speech recognition procedure. Specifically, the noise masks a part of the acoustic signal, thus giving rise to a loss of resolution of recognition. The greater the noise level, the more acute is this phenomenon. In certain situations, the useful signal is completely "drowned" in noise.

Another problem arises when the noise level varies very greatly from one instant to another. This is the case for example for an automobile going from the rest state to the running state, or else for an aircraft going from a take-off regime to a cruising regime. The noise processing must exhibit high performance under both conditions of sound environment.

Experience shows moreover that the problem arises with even greater severity when the variations in noise levels are very fast.

The known art has sought to combat the parasitic effects of noise. To do this, denoising processings, that is to say processings aimed at minimizing the effects of noise, are applied prior to voice recognition. However, these processings merely make it possible to limit the recognition rate degradation caused by noise. For high noise levels, they do not make it possible to maintain a sufficient degree of performance.

In all cases, the signal, after the denoising operations, remains marred by a so-called residual noise level. Although being much lower than the initial level, this residual noise level remains, in the majority of cases, non-negligible and greatly disturbs the voice recognition procedure. This method, on its own, is not therefore sufficient to eliminate nuisance effects.

Also, a complementary solution has been proposed which consists in rendering the parameterization pathway more robust, that is to say as unaffected by noise as possible. This characteristic is associated with the parameterization pathways which restore the most energy-laden phenomena of the speech signal. Specifically, the more energy-laden a component, the less vulnerable it is to noise.

However, here again, this process is not devoid of drawbacks. In exchange for the robustness obtained, it automatically involves a loss of sensitivity. In the absence of noise, a robust parameterization pathway naturally performs less well than a sensitive parameterization pathway.

The invention has targeted as its objective a process making it possible, at one and the same time, to preserve great sensitivity in a parameterization pathway when the level of the ambient noise is low, or even almost non-existent, and to render it robust in the presence of a considerable noise level.

To do this, the process according to the invention adapts, in real time, the degree of robustness of the parameterization pathway, in such a way as to obtain, at any instant, the best possible compromise between robustness and sensitivity, irrespective of the noise level.

The subject of the invention is therefore a process for voice recognition in a noisy acoustic signal, the process comprising at least one phase of digitizing and chopping said acoustic signal into the form of a string of temporal frames of predetermined duration, a phase of parameterizing said temporal frames in such a way as to transform them into a first series of vectors of parameters in the frequency domain and a phase of comparing said vectors of parameters of the first series with vectors of parameters of a second series, which are prerecorded in a preliminary so-called learning phase, in such a way as to achieve said recognition by determining a minimum distance between the vectors of the first series and particular vectors of the second series, characterized in that said parameterizing phase comprises the following steps:

the calculation of the spectral energy of said frames by squaring and applying a consecutive string of weighting windows each associated with a determined weighting coefficient, reproducing the shape of filters characterizing the human auditory system, in such a way as to create frequency channels;

a logarithmic compression of the energy values of the signals present in said frequency channels;

the generation of said string of vectors of parameters in the frequency domain;

and in that it comprises a step consisting in adding a predetermined value, the so-called shift value, to said determined weighting coefficients, in such a way as to modify said parameterization and to render said voice recognition more robust in the presence of noise.

The subject of the invention is also a voice recognition system for implementing this process.

The invention will be better understood and other characteristics and advantages will become apparent on reading the description which follows with reference to the appended figures, among which.

Before describing in detail a voice recognition system allowing the implementation of the process according to the invention, it is useful to detail the main components of parameterization circuits: block 11 of FIG. 1.

To fix matters, without thereby limiting in any respect the scope of the invention, an example of a conventional cepstral parameterization pathway, known by the initials "MFCC" (standing for "Mel Frequency Cepstral Coefficient"), will be described. This type of parameterization pathway is commonly used in voice recognition applications.

Figure 2:
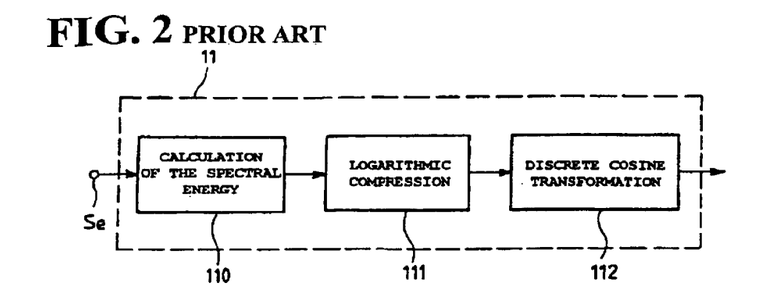
FIG. 2 illustrates, in greater detail, a parameterization block, component of the system according to FIG. 1.

FIG. 2 illustrates such a parameterization block 11. The latter comprises three functional modules, 110 to 112.

The first module, 110, makes it possible to determine the spectral energy. The input signals Se consist of digital frames generated by the circuits 10 (FIG. 1). The spectrum of each temporal frame is squared. Weighting windows, preferably sixteen so-called Bark windows reproducing the shape of the filters of the human auditory system, are subsequently applied to the digital values obtained so as to obtain sixteen energy values, in frequency channels.

Figure 3:
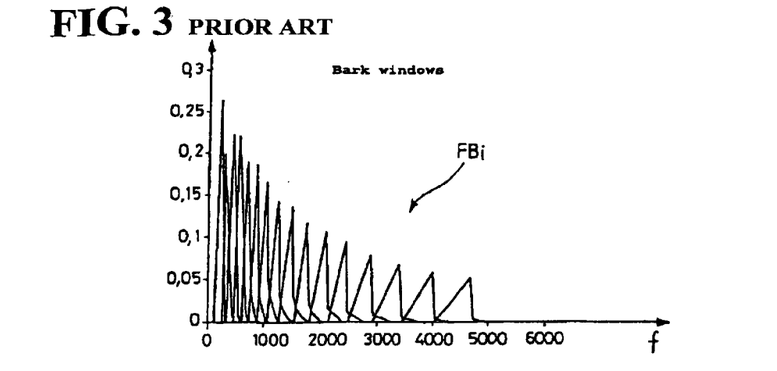
FIG. 3 is a diagram illustrating the configuration of so-called Bark windows.

FIG. 3 is a diagram illustrating the shape of the sixteen Bark windows applied, $FB_i$, with $1 \leq i \leq 16$. The amplitude of the weighting coefficients is represented as ordinate and the frequency (in Hz) as abscissa. The first few windows exhibit a spike of high amplitude and a narrow passband, whilst the amplitude of the windows of higher rank decreases and the passband widens. The Bark windows $FB_i$ exhibit pairwise overlaps. The exact characteristics of these Bark windows are well known in the state of the art and it is unnecessary to describe them further. For more details, reference may usefully be made to the book: "La parole et son traitement automatique" [Speech and its automatic processing], Calliope, published by MASSON, 1989, more particularly to page 268 of this book.

Figure 4:
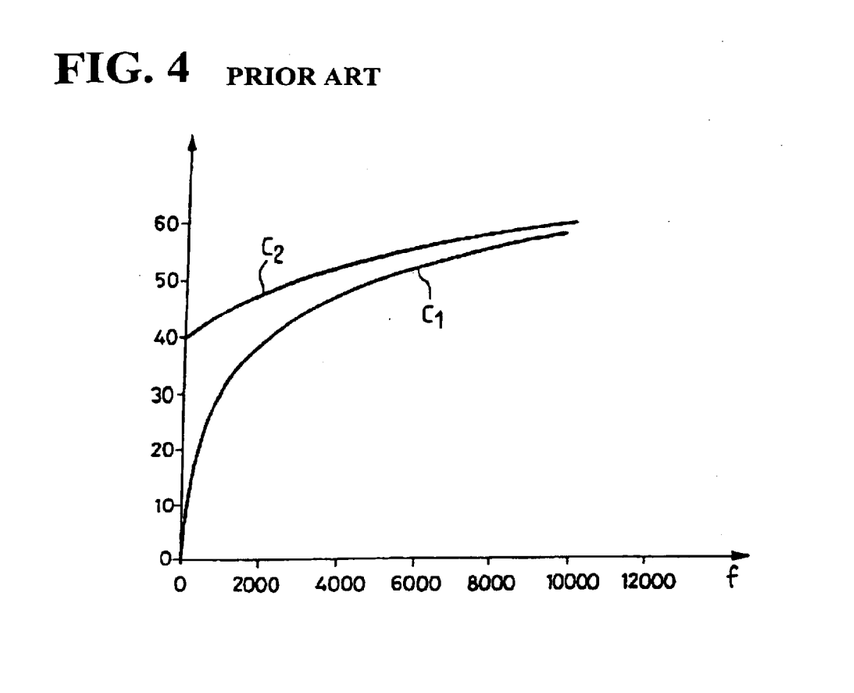
FIG. 4 is a diagram illustrating the shape of curves representing functions of Qlog type.

The sixteen values obtained are subsequently transmitted in the form of digital signals to logarithmic compression circuits 111. More precisely, the compression function is a Qlog function. By virtue of this function, an approximation of a logarithmic behavior is obtained. Such a function is represented in the diagram of FIG. 4, by the curve referenced $C_1$. Unlike a pure logarithm function which tends to minus infinity at the origin, the Qlog function takes the value zero at the origin. The Qlog function has logarithmic behavior for abscissa values greater than zero.

The compressed digital signals are subsequently transmitted to the module 112 which performs a discrete cosine transform. The coefficients 2 to 9 of this transform are subsequently selected. These coefficients constitute the sought-after parameter vector which is presented to the shape recognition block (FIG. 1:12).

It will now be shown that this parameterization pathway lacks robustness in the presence of noise. To measure the impact of noise, a study will be carried out on the distance d between two vectors representative of one and the same speech segment, with, in one case, noise present in a frame referenced 1 and, in the other case, no noise: frame referenced m. The distance d is given by the following relation:

$$d = \sum_{j=1\ldots 8} |c_{m,j} - c_{l,j}|, \quad (1)$$

with $C_{m,j}$ and $C_{l,j}$ the $j^{th}$ cepstral coefficients of frames m and 1, respectively.

It is assumed that the noise signal and speech signal are independent, hence the following relation:

$$B_{l,\,i} = B_{m,\,i} + B_{n,\,i} \quad (2)$$

in which relation $B_{1,i} = B_{m,i}$ and $B_{n,i}$ are the $i^{th}$ Bark coefficients of the noisy frame m, of the non-noisy frame l and of the pure noise, respectively.

Given the logarithmic compression and discrete cosine transform operations, the latter operation being a linear transformation, it can be shown that the distance d between two frames is an increasing function of the Qlog of the ratios between Bark coefficients. Therefore, the following relations are satisfied:

$$d = f\left(\left(Q\log\left(\frac{B_{l,i}}{B_{m,i}}\right)\right)\right) \text{for } i = 1 \ldots 16, \text{ and} \quad (3)$$

-continued $$d = f\left(\left(Q\log\left(1 + \frac{B_{n,i}}{B_{m,i}}\right)\right)\right) \text{ for } i = 1 \ldots 16. \quad (3\text{bis})$$

Therefore, if the ratio ($B_{n,i}/B_{m,i}$) is large, that is to say if the noise is much stronger than the useful signal, the distance between the two frames is considerable, thus indicating a lack of robustness since the two frames have the same content. This eventuality is all the more important the smaller the Bark coefficient $B_{m,i}$. The distortion between two frames is caused mainly by the least energy-laden Bark coefficients, that is to say those which carry the least acoustic information.

According to a first important characteristic of the process according to the invention, a shift value $K_i$, or "offset", is added to the set of Bark coefficients $B_i$.

Figure 5:
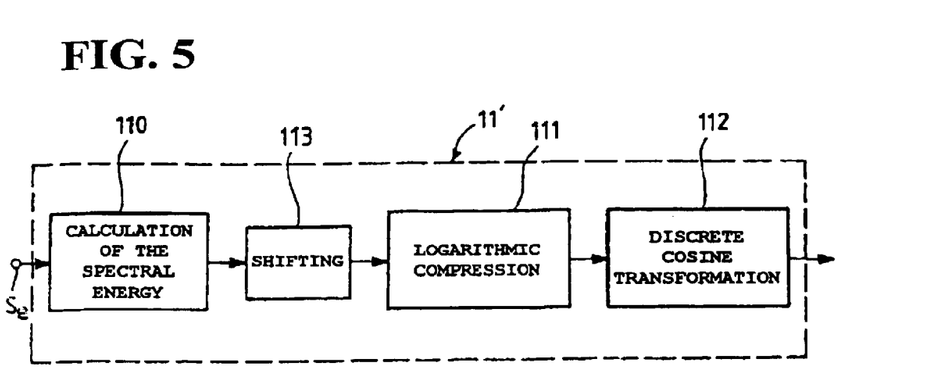
FIG. 5 illustrates a parameterization pathway for implementing the voice recognition process according to a first embodiment of the invention.

The parameterization pathway modified according to the process of the invention, henceforth referenced 11', is illustrated by FIG. 5. The circuits 110, 111 and 112 are strictly identical, as regards the functions fulfilled, to the circuits of the same reference of FIG. 2, and it is unnecessary to redescribe them. In the embodiment illustrated by FIG. 5, a supplementary circuit 113 is interposed between the circuits 110 and 111. The function of this circuit is to apply the aforesaid offset to the sixteen Bark coefficients.

The relation (3bis) then becomes:

$$d = f\left(\left(Q\log\left(1 + \frac{B_{n,i}}{K_i + B_{m,i}}\right)\right)\right) \text{ for } i = 1 \ldots 16 \quad (4)$$

Relation (4) shows that the distance d is an increasing function of the ratios ($B_{n,i}/(K_i+B_{m,i})$) Stated otherwise, if ($B_{m,i}$) is small, then the offset $K_i$ compensates for its smallness and prevents the ratio from taking overly large values, which would give rise to an excessive distance d between the two frames. Hence, it is also found that, the larger the offset, the more robust the system becomes, since it is insensitive, or at the least only very slightly sensitive, to the variations in the Bark coefficients of low energy.

However, if the offset coefficient is constant, it remains a residual drawback. Specifically, the sensitivity decreases and the significant variations related to the differences in content of the frames might not be taken into account.

Returning now to the diagram of FIG. 4. Represented in this diagram is the curve Qlog modified owing to the application of the aforesaid offset $K_i$. It is assumed, by way of example, that $K_i$ is chosen to be equal to 2000. It is found that the initial slope of the modified Qlog curve $C_2$, for this value of $K_i$, passes through the ordinate 40 at the origin and exhibits a lower slope than the unmodified Qlog curve $C_1$, thus reflecting reduced sensitivity to the variations of the Bark coefficients of low levels.

In a preferred embodiment of the process of the invention, the results obtained will be further improved by rendering the robustness adaptive, in real time, to the ambient noise level.

In what follows, the expression "configuration of the offsets" will refer to the set of values of the sixteen offsets that are added to the sixteen Bark coefficients. This offset configuration determines the robustness of the parameterization pathway. Specifically, the bigger the values of the offsets, the more robust the parameterization, but, on the other hand, the coarser is its resolution. It follows that the achieving of an optimal compromise between robustness and sensitivity is directly determined by the offset configuration. The invention harnesses this observation.

The sixteen offset values being independent, it is therefore possible to choose distinct values for the sixteen Bark type frequency channels. The choice of offset values will be determined by two main factors.

Firstly, the mean spectrum of human speech is considered. This spectrum naturally exhibits much greater energy at low and medium frequencies than at high frequencies.

Secondly, the spectral distribution of the noise is considered. As has been indicated, the robustness ought to be superior for the channels exhibiting the highest noise level. By way of example, in the preferred application, that is to say voice recognition in military type aircraft, the noise picked up by the oxygen mask of the pilot typically exhibits a spike at 2 kHz. It is therefore advantageous for the offset corresponding to this frequency value to be high.

A complete system for voice recognition implementing the process according to a preferred embodiment of the invention will now be described with reference to the block diagram of FIG. 6.

The voice recognition system, henceforth referenced 2, receives as input a temporal signal U(t). This signal can consist of a pure useful signal, that is to say speech unmarred by noise, an acoustic signal which is drowned in noise to a greater or lesser extent, or a noise signal alone.

It is therefore firstly necessary to determine, in a preliminary phase, the characteristics of the noise at the moment of articulation. This preliminary processing is performed by a block referenced 3.

A first module, 30, discriminates in the incoming temporal signal U(t), the speech signal and the noise signal. The noise segments are isolated and transmitted to a noise modeling module 31. The detection of speech is a well-known conventional signal processing. Various methods have been proposed.

The preliminary processing recalled briefly hereinabove can be of a known type. In particular, the formulating of a noise model of a noisy signal is an operation which is conventional per se. However, the method implemented for this operation can be a method of the known art, but also an original method.

A method for formulating a noise model, which method is particularly adapted to the main applications aimed at by the process of the invention, will be described hereinbelow with reference to FIGS. 7 and 8.

This method relies on a continuous and automatic search for a noise model. The search is performed on the digitized samples of the signal U(t) which are stored in a buffer input memory (not represented). This memory is capable of simultaneously storing all the samples of several frames of the input signal (at least two frames and, in the general case, N frames).

The sought-after noise model consists of a succession of several frames whose energy stability and relative energy level would suggest that one is dealing with ambient noise and not with a speech signal or some other disturbing noise. The way in which this automatic search is carried out will be seen hereinbelow.

When a noise model is found, all the samples of the N successive frames representing this noise model are preserved in memory, so that the spectrum of this noise can be analyzed and can serve for denoising. However, the automatic search for noise continues starting from the input temporal signal U(t) so as possibly to find a more recent and more suitable model, either because it represents the ambient noise better, or because the ambient noise has altered. The most recent noise model is placed in memory instead of the previous model, if the comparison with the previous model shows that it is more representative of the ambient noise.

The starting postulates for the automatic formulating of a noise model are the following:

- the noise which one wishes to eliminate is the ambient background noise,
- the energy of the ambient noise is relatively stable in the short term,
- the speech is usually preceded by a breathing noise of the pilot which must not be confused with the ambient noise; however, this breathing noise disappears a few hundred milliseconds before the first transmission of speech proper, so that what remains is only the ambient noise just before the speech transmission,
- and, finally, the various noises and the speech are superposed in terms of signal energy, so that a signal containing speech or a disturbing noise, including breathing into the microphone, necessarily contains more energy than an ambient noise signal.

As a result of this, the following simple assumption will be made: the ambient noise is a signal exhibiting minimum short-term stable energy. The expression short term is understood to mean a few frames, and in the practical example given hereinafter it will be seen that the number of frames for evaluating the stability of the noise is from 5 to 20. The energy must be stable over several frames, failing which it must be assumed that the signal basically contains speech or noise other than ambient noise. It must be a minimum, failing which the signal is regarded as containing breathing or phonetic speech elements resembling noise but superimposed on the ambient noise.

Figure 7:
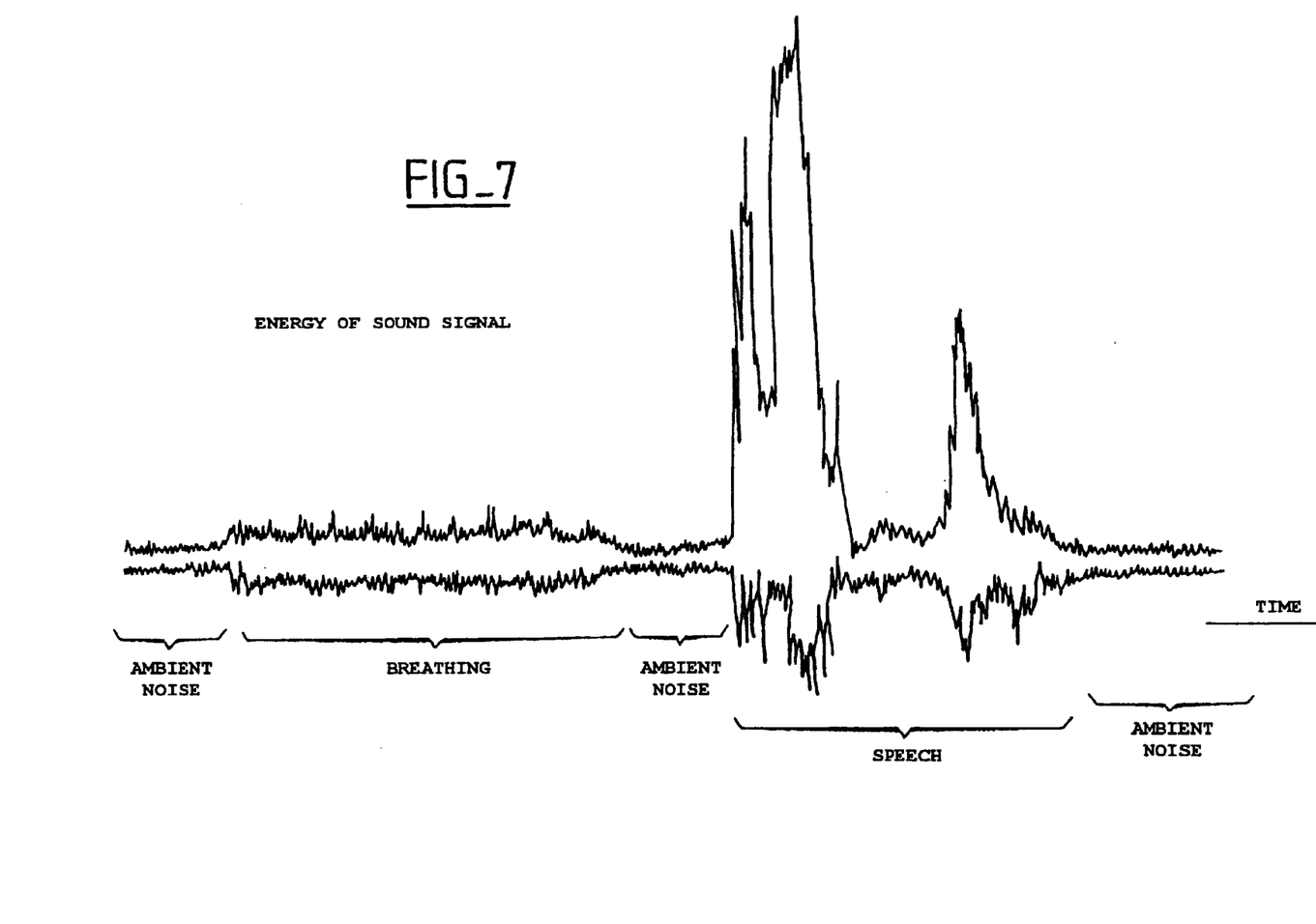
FIG. 7 represents a typical example of an acoustic signal arising from a noisy sound capture.

FIG. 7 represents a typical configuration of temporal evolution of the energy of a microphone signal at a start of speech transmission, with a breathing noise phase, which disappears for a few tens to hundreds of milliseconds, giving way to ambient noise alone, after which a high energy level indicates the presence of speech, and finally reverting to ambient noise.

The automatic search for ambient noise then consists in finding at least N1 successive frames (for example N1=5) whose energies are similar, that is to say the ratio of the signal energy contained in a frame to the signal energy contained in the previous frame or, preferably, frames, lies inside a determined range of values (for example between ⅓ and 3). When such a succession of frames of relatively stable energy has been found, the digital values of all the samples of these N frames are stored. This set of NxP samples constitutes the current noise model. It is used in the denoising. The analysis of the subsequent frames continues. If another succession of at least N1 successive frames meeting the same energy stability conditions (ratios of energies of frames in a determined range) is found, then the mean energy of this new succession of frames is compared with the mean energy of the stored model, and the latter is replaced with the new succession if the ratio of the mean energy of the new succession to the mean energy of the stored model is less than a determined replacement threshold which may be 1.5 for example.

It follows from this replacement of a noise model with a more recent model which is less energy-laden or not much more energy-laden, that the noise model is tailored globally to the continuous ambient noise. Even before a speech capture, preceded by breathing, there exists a phase where ambient noise alone is present for a sufficient duration to be able to be taken into account as active noise model. This phase of ambient noise alone, after breathing, is short. The number N1 is chosen to be relatively small, so that there is time to retailor the noise model to the ambient noise after the breathing phase.

If the ambient noise evolves slowly, the evolution will be taken into account due to the fact that the threshold of comparison with the stored model is greater than one. If it evolves faster in the increasing direction, the evolution might not be taken into account, so that it is preferable that provision be made from time to time for a reinitialization of the search for a noise model. For example, in an aircraft at rest on the ground, the ambient noise is relatively low, and the noise model ought not, in the course of the take-off phase, remain frozen at what it was at rest, owing to the fact that a noise model is only replaced with a less energy-laden model or one which is not much more energy-laden. The reinitialization methods envisaged will be explained later.

Figure 8:
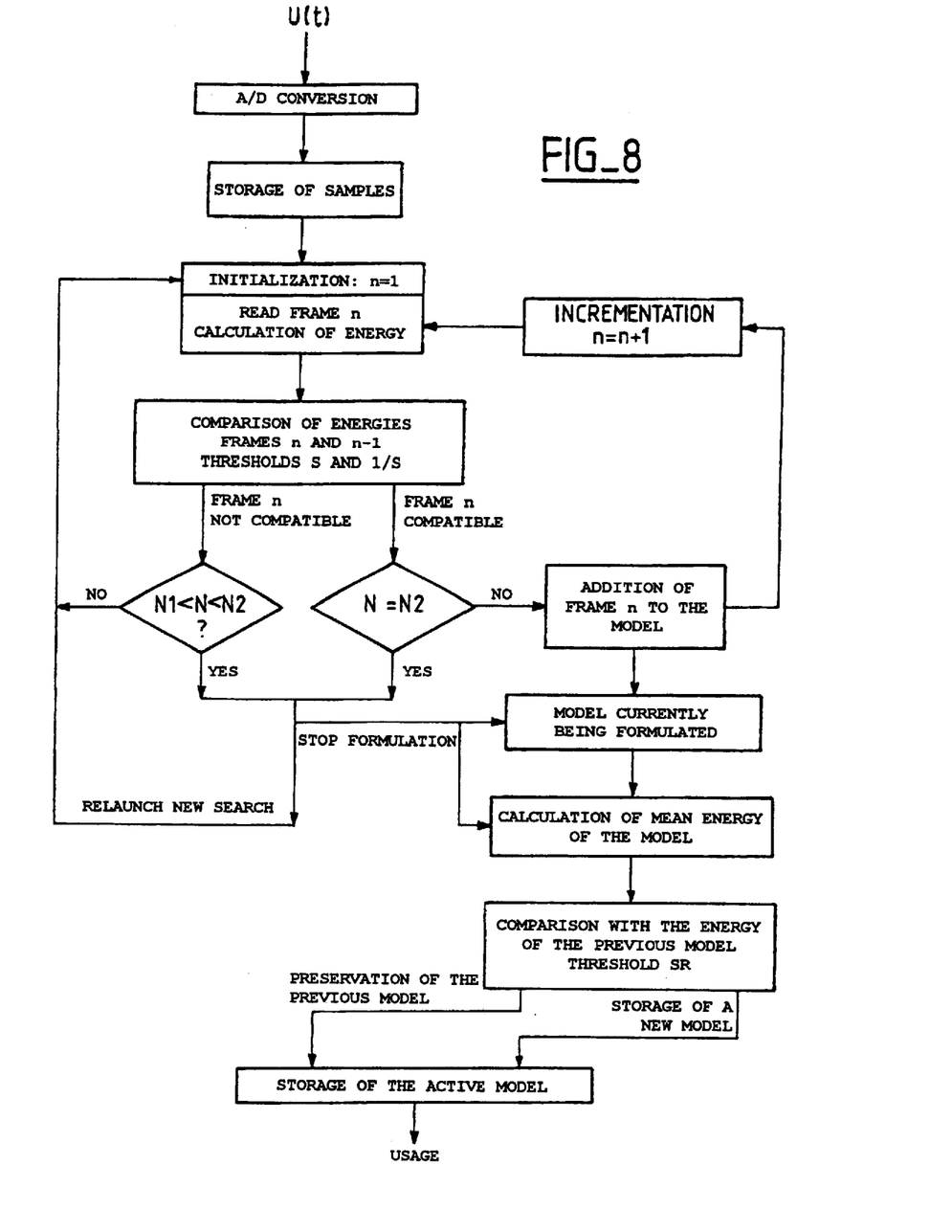
FIG. 8 is a flowchart representing the steps of a particular process for searching for a noise model.

FIG. 8 represents a flowchart of the operations for the automatic search for an ambient noise model.

The input signal U(t), sampled at the frequency $F_e=1/T_e$ and digitized by an analog/digital converter, is stored in a buffer memory capable of storing all the samples of at least two frames.

The index of the current frame in a noise model search operation is denoted n and is counted by a counter as the search proceeds. On initializing the search, n is set to 1. This index n will be incremented along with the formulating of a model of several successive frames. When analyzing the current frame n, the model already comprises by assumption n−1 successive frames meeting the conditions imposed for forming part of a model.

It is firstly considered that one is dealing with a first model formulation, no other previous model having been constructed. What happens in respect of subsequent formulations will be seen later.

The signal energy of the frame is calculated by summing the squares of the digital values of the samples of the frame. It is preserved in memory.

The next frame of rank n=2 is then read, and its energy is calculated in the same way. It is also preserved in memory.

The ratio of the energies of the two frames is calculated. If this ratio lies between two thresholds S and S', one of which is greater than 1 and the other less than 1, the energies of the two frames are regarded as similar and the two frames are regarded as possibly forming part of a noise model. The thresholds S and S' are preferably mutually inverse (S'=1/S) so that it is sufficient to define one to obtain the other. For example, a typical value is S=3, S'=⅓. If the frames may form part of one and the same noise model, the samples of which they are composed are stored so as to begin constructing the model, and the search continues by iteration by incrementing n by one unit.

If the ratio of the energies of the first two frames falls outside the prescribed interval, the frames are declared to be incompatible and the search is reinitialized by resetting n to 1.

In the case where the search continues, the rank n of the current frame is incremented, and a calculation of energy of the next frame and a comparison with the energy of the previous frame or of the previous frames is performed, in an iterative procedural loop, using the thresholds S and S'.

It will be noted in this regard that two types of comparison are possible for adding a frame to n−1 preceding frames which have already been regarded as homogeneous in terms of energy: the first type of comparison consists in comparing solely the energy of frame n with the energy of frame n−1. The second type consists in comparing the energy of frame n with each of the frames 1 to n−1. The second way culminates in greater homogeneity of the model but has the drawback of not taking sufficient account of cases where the noise level increases or decreases rapidly.

Thus, the energy of the frame of rank n is compared with the energy of the frame of rank n−1 and possibly of other preceding frames (not necessarily all however).

If the comparison indicates that there is not homogeneity with the previous frame, owing to the fact that the ratio of the energies does not lie between 1/S and S, two cases are possible:

either n is less than or equal to a minimum number N1 below which the model cannot be regarded as significant of ambient noise since the duration of homogeneity is too short; for example N1=5; in this case the model currently being formulated is abandoned and the search is reinitialized to the start by resetting n to 1;

or n is greater than the minimum number N1. In this case, since a lack of homogeneity is now found, it is regarded that there is perhaps a start of speech after a homogeneous noise phase, and all the samples of the n−1 homogeneous noise frames which preceded the lack of homogeneity are preserved in the guise of noise model. This model remains stored until a more recent model is found which also seems to represent ambient noise. The search is reinitialized anyway by resetting n to 1.

However, comparing frame n with the previous ones could again have resulted in a frame which is again homogeneous in terms of energy with the previous frame or frames. In this case, either n is less than a second number N2 (for example N2=20) which represents the maximum desired length for the noise model, or else n has become equal to this number N2. The number N2 is chosen in such a way as to limit the calculation time in the subsequent operations for spectral noise density estimation.

If n is less than N2, the homogeneous frame is added to the previous frames so as to contribute to the construction of the noise model, n is incremented and the next frame is analyzed.

If n is equal to N2, the frame is also added to the previous n−1 homogeneous frames and the model of n homogeneous frames is stored so as to serve in noise elimination. The search for a model is moreover reinitialized by resetting n to 1.

The previous steps relate to the first search for a model. However, once a model has been stored, it can at any moment be replaced with a more recent model.

The replacement condition is again an energy condition, but this time it pertains to the mean energy of the model rather than to the energy of each frame.

Consequently, if a possible model has just been found, with N frames where N1<N<N2, then the mean energy of this model is calculated, this being the sum of the energies of the N frames, divided by N, and it is compared with the mean energy of the N' frames of the previously stored model.

If the ratio of the mean energy of the new possible model to the mean energy of the current model in force is less than a replacement threshold SR, the new model is regarded as better and it is stored in place of the previous one. Otherwise, the new model is rejected and the old one remains in force.

The threshold SR is preferably slightly greater than 1.

If the threshold SR were less than or equal to 1, the least energy-laden homogeneous frames would be stored each time, this indeed corresponding to the fact that the ambient noise is regarded as the energy level below which one never descends. However, any possibility of evolution of the model would be eliminated if the ambient noise were to start to increase.

If the threshold SR were too high above 1, there would be a risk of distinguishing poorly between ambient noise and other disturbing noise (breathing), or even certain phonemes which resemble noise (sibilants or palato-alveolar fricatives, for example). The elimination of noise on the basis of a noise model tailored to breathing or to sibilants or palato-alveolar fricatives would then incur the risk of impeding the intelligibility of the denoised signal.

In a preferred example the threshold SR is around 1.5. Above this threshold the old model will be preserved; below this threshold the old model will be replaced with the new. In both cases, the search will be reinitialized by restarting the reading of a first frame of the input signal U(t), and by setting n to 1.

To render the formulation of the noise model more reliable, provision may be made for the search for a model to be inhibited if a speech transmission is detected in the useful signal. The digital signal processing operations commonly used in speech detection make it possible to identify the presence of speech by utilizing the characteristic periodicity spectra of certain phonemes, in particular the phonemes corresponding to vowels or to voiced consonants.

The purpose of this inhibition is to prevent certain sounds from being considered to be noise, whereas they are useful phonemes, a noise model based on these sounds from being stored and the removal of noise subsequent to the formulating of the model from then tending to remove all the similar sounds.

Moreover, it is desirable to make provision from time to time for a reinitialization of the search for the model so as to allow a reupdating of the model while the increases in the ambient noise have not been taken into account owing to the fact that SR is not much greater than 1.

The ambient noise can in fact increase considerably and rapidly, for example during the phase of acceleration of the engines of an aircraft or of some other air, land or sea vehicle. However, the threshold SR compels the previous noise model to be preserved when the mean noise energy increases too quickly.

If one wishes to remedy this situation, it is possible to proceed in various ways, but the simplest way is to reinitialize the model periodically by searching for a new model and by prescribing it to be the active model independently of the comparison between this model and the model previously stored. The periodicity can be based on the mean duration of articulation in the application envisaged; for example, the durations of articulation are on average a few seconds for the crew of an aircraft, and the reinitialization can take place with a periodicity of a few seconds.

The implementation of the method for formulating a noise model (FIG. 6: module 31) can be effected on the basis of non-specialized computers, provided with necessary calculation programs and receiving the samples of digitized signals such as they are provided by an analog/digital converter, via a suitable port.

This implementation can also be effected on the basis of a specialized computer based on digital signal processors, this making it possible to process a larger number of digital signals more rapidly.

Computers are associated, as is well known, with various types of memories, static and dynamic, for recording the programs and the intermediate data, as well as with circulating memories of the "FIFO" type.

The processing phases which are more specific to the process according to the invention will now be described.

The energy of the noise before articulation reflects the sound environment in which the voice recognition is evolving. This value therefore makes it possible to define the robustness requirement necessary for the nominal operation of the voice recognition. To obtain optimal adaptation of the voice recognition as a function of the noise level, the process according to the invention introduces a dependency between the noise energy measured and the parameterization pathway.

This operation comprises two main steps.

The first step, carried out in the single module 40 of the block 4, consists in quantifying the energy of the noise. This module receives directly the speech signals and the noise signals emanating from the noise modeling module 31.

To carry out the aforesaid quantification, the energy of the noise is determined and it is compared with a predefined series of values of the energy. As is known, the energy of a signal can be obtained simply by taking the quadratic mean of samples. Each interval, bounded by a maximum value and a minimum value of noise energy will correspond to a predetermined level of robustness. Stated otherwise, for all the noise energy values inside one and the same interval, the parameterization pathway is constant. Naturally, the various intervals are contiguous.

The determination of the operating spans is performed, a priori, once and for all, during a preliminary phase, as a function of the precise application envisaged.

To fix matters, and by way of nonlimiting example, for voice recognition in a military aircraft, it is typically possible to define five spans of variation of cabin noise:

span 1: 0 to 90 dB span 2: 90 to 98 dB span 3: 98 to 106 dB span 4: 106 to 114 dB span 5: $\geq$ 114 dB The second step consists in selectively modifying the parameterization pathway. Stated otherwise, to each operating span there corresponds a different parameterization pathway.

The parameterization pathway proper is depicted by a block 5 itself comprising several modules: a module 50, which will be referred to for convenience as a switch, an optional module 51 for denoising the speech signal, a module 52 for calculating the Bark coefficients, a module 53 for configuring the offsets and a module 54 for calculating cepstra.

The parameterization pathway 5 exhibits a configuration similar to that described with regard to FIG. 5. In particular, the module 52 makes it possible to determine the spectral energy contained in the Bark windows. It is identical to the module 110 of FIG. 5. The module 54 encompasses, for its part, the modules 111 and 112 of FIG. 5. These modules are moreover common to the known art (FIG. 2: 110 to 112).

The calculation of the spectral energy can be preceded, optionally, by a denoising of the speech signal carried out in the module 52. To do this, the module 51 can comprise, conventionally, a Wiener filter or a generalized Wiener filter.

By way of nonlimiting examples, Wiener filters are described in the following books, to which reference may usefully be made:

Yves THOMAS: "Signaux et systèmes linéaires" [Linear signals and systems], published by MASSON (1994); and:

François MICHAUT: "Méthodes adaptatives pour le signal" [Adaptive methods for signals], published by HERMES (1992).

The Wiener filter receives, as input, a digital signal, the so-called useful signal, marred by noise, for example the speech signal in the application described, and restores on its output this same signal rid, theoretically, of the noise component. However, as recalled, whereas the denoising methods actually improve the signal-to-noise ratio, there is usually still residual noise, generally of non-negligible amplitude.

On the other hand, the parameterization pathway 5 comprises two elements which are specific to the invention.

The first, referenced 53, makes it possible, as in the case of the configuration described with regard to FIG. 5, to add offset values to the Bark coefficients. However, the advantageous characteristic peculiar to the preferred embodiment, illustrated by FIG. 6, the offset values are no longer constant over time. For each of the aforesaid energy spans, a distinct offset configuration is applied. As recalled, the number of spans depends on the specific application envisaged. In the example illustrated by FIG. 6, it has been assumed that there were five spans and hence five different offset configurations.

The second specific module consists of what has been referred to as the switch 50. This facility detects the result of the comparison performed in the quantification module 40. By way of example, the result of the comparison can consist of a binary control word, representing numbers 1 to 5, and more generally 1 to n, if there are n distinct configurations. The facility 50 cooperates with the module 53 and transmits this binary control word to it through the link 500. It can comprise a memory area 530, for example consisting of registers for storing various offset configurations, and an area of logic circuits 531 allowing the addition of the offsets $K_i$ to the 16 Bark coefficients. The binary word transmitted through the link 500 makes it possible to select one of the offset configurations recorded in the area 530 and its application to the Bark coefficients, in the manner described earlier, before the logarithmic compression operation performed in the module 54.

The shape recognition module 6 can be embodied by calling upon a method which is conventional per se and well known, for example of the so-called "DTW" type (standing for "Dynamic Time Warping") or "HMM" type (standing for "Hidden Markov Model"). However, it is advantageous for the shape recognition module to be informed of the offset configuration adopted. Indeed, in the conventional methods of shape recognition, it is usual to take account of a so-called "pruning" threshold parameter which corresponds to the maximum distortion permitted for a given articulation. This parameter dimensions the response time of the system. To maintain a constant response time, it is advantageous to make it evolve in correlation with the evolution of the offsets. The module 50 therefore likewise transmits, via a link 501, a control word to the shape recognition module 6, with a view to adjusting the so-called "pruning" threshold for each offset configuration employed. The necessary adaptation of the block 6 requires only a tiny modification of the standard circuits used for this purpose. The control word can also be the same as that transmitted to the module 53. In this case, the same transmission link 500 is used.

In an entirely conventional manner also, once the phrase has been recognized, the digital signals representing it are transmitted to a usage block 7: earphones, recorder, etc.

Figure 6:
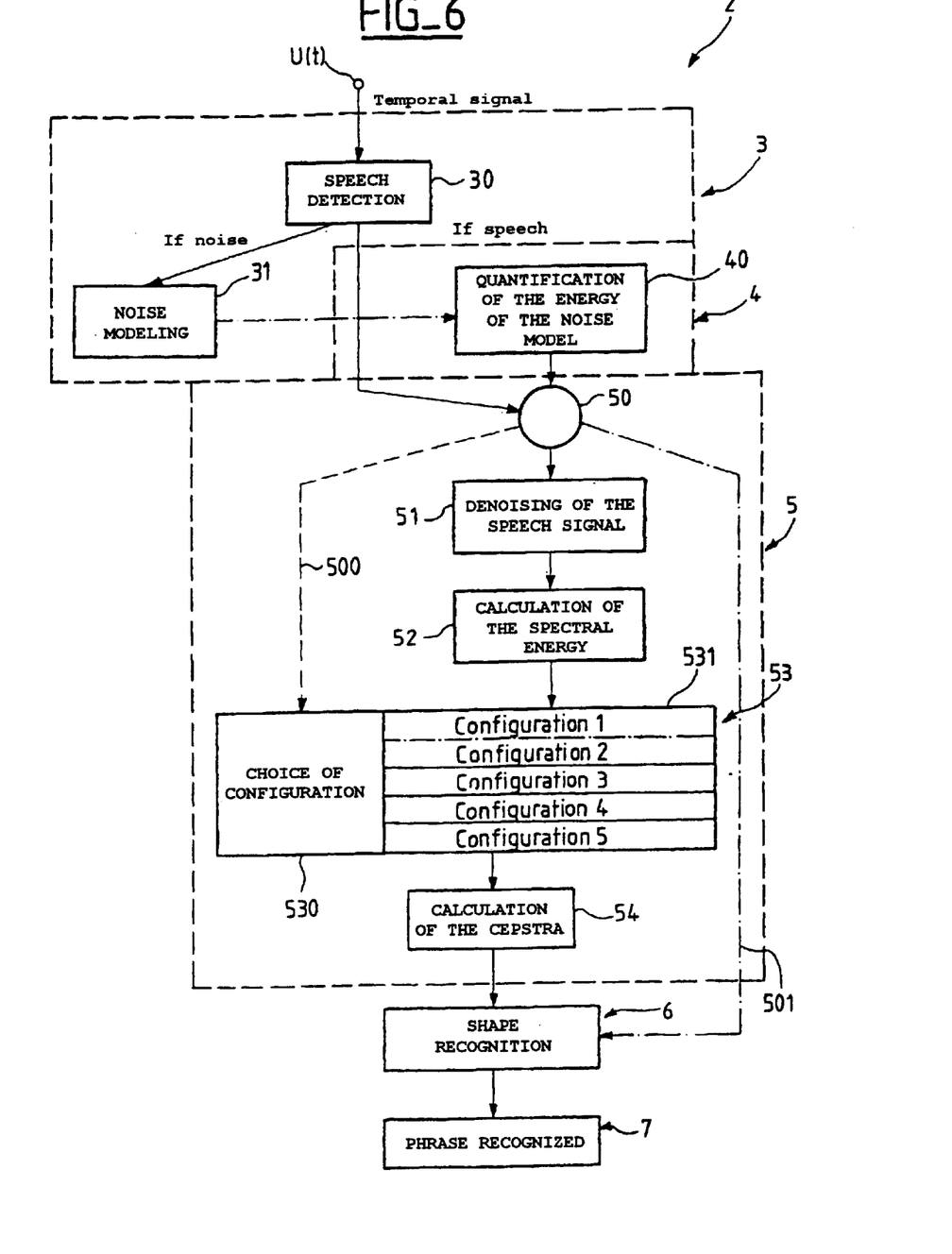
FIG. 6 illustrates a complete system implementing the voice recognition process according to a preferred embodiment of the invention.

On reading the foregoing, it is readily appreciated that the system just described with regard mainly to FIG. 6, does indeed achieve the objectives aimed at by the invention.

It permits an optimized compromise between robustness and sensitivity, by choosing, adaptively and in real time, the characteristics of the parameterization pathway as a function of the noise level.

It allows adaptation to changing noises, by analyzing the noise present for each articulation.

An experimental system, for implementing the voice recognition process according to a preferred embodiment of the invention, and based on the configuration described in FIG. 6, has shown that the recognition rate and the performance in noise were markedly improved. The error rate was typically divided in a ratio of one to three.

On the other hand, the supplementary constraints imparted by the process and the system according to the invention remain very limited.

In respect of the learning phase, the implementation of the process according to the invention does not substantially modify the workload of the operator, as regards the acoustic references (stored references). However, the calculation time of the station in which the learning is carried out increases. This is due to the fact that it is necessary to perform learning for each predefined offset configuration. It should however be stated that these calculations are performed once and for all, or at least on rare occasions only: system modifications, increase in the learning corpus, etc.

On the other hand, during the recognition phases, that is to say the operational phases, the recognition time is identical to that of recognition with conventional cepstral parameterization. Specifically, the extra calculation time required by the quantification of the energy of the noise and the loading of the offset configuration values is entirely negligible as compared with the calculation time related to the recognition proper.

From a hardware point of view, the system requires a bigger memory space for storing the acoustic references associated with the various offset configurations. However, owing to the advances in current technology: miniaturization of the memory facilities based on integrated circuits and increase in their capacity, owing also to the constant drop in rice of facilities of this type, the aforesaid requirement remains compatible with realistic industrial and economic considerations.

It has also been shown that the process and the system according to the invention are still compatible with the technologies implemented in the area of voice recognition. The gist of the conventional circuits can still be used. The process in fact only necessitates restricted adaptations and the addition of a few specific functional modules, likewise in restricted number.

It should be clear, however, that the invention is not limited solely to the embodiments explicitly described, in particular in conjunction with FIGS. 2 and 6. In particular, the numerical values have been stated merely to fix matters. They depend essentially on the precise application targeted. Such is the case in particular as regards the number of predefined energy spans and the number of offset configurations which result therefrom.

It should be clear also, that although particularly suited to voice recognition in a military aircraft, the invention shall not be confined to applications of this type alone. It in fact applies to voice recognition in all noisy environments.

What is claimed is:

1. A process for voice recognition in an acoustic signal, the process comprising a step of digitizing and chopping said acoustic signal into a string of frames of predetermined duration, a step of parameterizing said frames in such a way as to transform them into a first series of vectors of parameters in frequency domain and a step of comparing said first series of vectors of parameters with vectors of parameters of a second series, which are prerecorded in a preliminary learning step, in such a way as to achieve said voice recognition by determining a minimum distance between the vectors of the first series and particular vectors of the second series, wherein said parameterizing step comprises the following steps:

calculating spectral energy of said frames by squaring and applying a consecutive string of weighting windows each associated with a determined weighting coefficient, reproducing a shape of filters characterizing a human auditory system, in such a way as to create frequency channels;

logarithmically compressing energy values of signals present in said frequency channels;

generating said first series of vectors of parameters in the frequency domain; and adding a predetermined shift value to said determined weighting coefficients, in such a way as to modify said step of calculating to render said voice recognition more robust in the presence of noise.

2. The process as claimed in claim 1, wherein said weighting windows are Bark weighting windows and are sixteen in number.

3. The process as claimed in claim 1, wherein said step of logarithmically compressing is achieved by utilizing a Qlog function.

4. The process as claimed in claim 1, wherein said step of generating said first series of vectors of parameters in the frequency domain comprises applying a discrete cosine transform to said logarithmically compressed energy values and each parameter vector is obtained by selecting two to nine coefficients of the discrete cosine transform.

5. The process as claimed in claim 1, wherein the predetermined shift value added to said determined weighting coefficients can vary from one frequency channel to another, and the amplitude of the predetermined shift value is higher for determined weighting coefficients associated with frequency channels conveying largest energies.

6. The process as claimed in claim 5, wherein an amplitude of said predetermined shift values added to said determined weighting coefficients associated with channels of low and medium frequencies of a mean spectrum of acoustic signals of human speech are higher than an amplitude of the predetermined shift values added to the channels of highest frequencies of the medium spectrum of human speech.

7. The process as claimed in claim 1, further comprising a first preliminary step of determining a string of contiguous spans of levels of predetermined noise energies, a second preliminary step of determining, for each of said spans a distinct configuration of said predetermined shift values to be added to said determined weighting coefficients, and a supplemental step comprising a first step of quantifying the energy of the noise present in said acoustic signal by comparison with said series of contiguous energy spans and a second step of applying one of said configurations of predetermined shift values to said determined weighting coefficients, as a function of a result of said quantification.

8. The process as claimed in claim 7, wherein a choice of one of said configuration of predetermined shift values is performed so that an amplitude of these predetermined shift values increases with an amplitude of the level of noise energy present in said acoustic signal.

9. The process as claimed in claim 1, further comprising a supplemental preliminary step of determining a model of evolution of characteristics of the noise present in said acoustic signal.

10. The process as claimed in claim 1, further comprising, before said step of applying a consecutive string of weighting windows associated with determined weighting coefficients, a supplemental step of denoising said acoustic signal utilizing a Wiener filter or a generalized Wiener filter, in such a way as to decrease a noise component present in said acoustic signal.

11. A system for voice recognition in an acoustic signal, comprising:

means for digitizing and chopping said acoustic signal into a string of frames of predetermined duration and means for parameterizing said frames in such a way as to transform them into a first series of vectors of parameters in frequency domain, wherein said means for parameterizing comprising, a first module for calculating a spectral energy of said frames by squaring and applying a consecutive string of weighting windows, each weighting window being associated with a determined weighting coefficient, in such a way as to create frequency channels, a second module for adding a shift value to said determined weighting coefficients, a third module for performing a logarithmic compression on said determined weighting coefficients to obtain compressed determined weighting coefficients, and a fourth module for applying a discrete cosine transform to said compressed determined weighting coefficients in such a way as to obtain said first series of vectors of parameters, wherein the fourth module comprises means for recognizing shapes by comparing said vectors of parameters of the first series with vectors of parameters of a second series, which are prerecorded, in such a way as to achieve said voice recognition, by calculating distances between vectors of the first and second series.

12. The system for voice recognition as claimed in claim 11, further comprising means for quantifying energy of the noise present in said frames and comparing with a series of preestablished energy spans in such a way as to select a configuration of values of shifts from among a distinct configuration string, equal in number to a number of said preestablished energy spans and means for applying said configuration to said determined weighting coefficients by adding said shift values.

13. The system for voice recognition as claimed in claim 12, further comprising means for modeling the noise present in said frames, signals representing the model noise being transmitted to said means for quantifying the energy of the noise.

14. The system for voice recognition as claimed in claim 11, further comprising means for reducing the noise present in said acoustic signal and in that these means comprise a Wiener filter or a generalized Wiener filter.

* * * * *